June 25, 1963 E. H. BECKER 3,094,801

IDENTIFICATION DEVICE

Filed March 8, 1961

INVENTOR.
EUGENE H. BECKER

BY
Morgan, Finnegan, Durham & Pine

ATTORNEYS

United States Patent Office 3,094,801

Patented June 25, 1963

3,094,801

IDENTIFICATION DEVICE

Eugene H. Becker, 73—48 183rd St., Flushing 66, N.Y.

Filed Mar. 8, 1961, Ser. No. 94,221

4 Claims. (Cl. 40—70)

The invention relates to an identification device and more particularly is related to a device for permitting numbered identification of a prisoner when he is being photographed.

It has long been the custom after a prisoner has been taken into custody to photograph the prisoner with an identification number for the purpose of identifying the prisoner. In the past it has been the custom to provide a device which may have a box like form which includes slots on the face thereof. In one of the slots it was the practice to place a number which became the prisoner's identification number. These prior devices were generally satisfactory but were time consuming in operation and clumsy to position on the prisoner.

These prior devices were clumsy and time consuming because a separate box was provided which includes tabs or cards having numbers thereon. Consequently, after determining what the prisoner's identification number was to be, it was necessary to search through the box number and select the appropriate numerals. The selected numerals were then slid into the slot to form the prisoner's identification number. Since identification numbers may have as many as six numerals therein, this was a time consuming procedure. Also the numerals frequently became lost and after a period of time became damaged and required replacement. Thus, prior known and used identification devices had several disadvantages.

In addition, prior art identification devices included pin means of some sort which were adapted to secure the identification device to the prisoner's clothing adjacent the prisoner's shoulder. The use of pin means is objectionable, since it is time consuming and may result in ripping or tearing of the prisoner's clothing. Obviously, the pin means was of no value where the prisoner had no clothing to which the pin could be attached.

In accordance with this invention a simple and compact structure is provided which includes a plurality of disks having numerals thereon which are rotated to locate the prisoner's identification number in a position where it can be quickly and easily photographed. The invention further includes means for locating the identification device on the prisoner in its proper position expeditiously and without damaging the prisoner's clothing.

It will be appreciated that the device of the present invention is not necessarily limited to a prisoner identification device, and that it can serve and be used for other purposes.

In view of the foregoing, it is an object of this invention to provide a new and improved identification device.

A further object of this invention is to provide an improved prisoner identification device wherein the prisoner's number can be easily and expeditiously arranged.

Another object of this invention is to provide an improved prisoner identification device wherein the device can be properly and easily located on the prisoner.

Another object of this invention is to provide an improved prisoner identification device including a plurality of indicia bearing disks wherein a novel supporting structure for the disks is provided.

A still further object of this invention is to provide a device wherein numerals and blank spaces are located on indicia bearing disks whereby identification numbers having only five figures can be used.

A further object of this invention is to provide an improved prisoner identification device including indicia and bearing disk wherein a novel indicia bearing disk is provided.

Another object of this invention is to provide a novel prisoner's identification device including a supporting member wherein a novel arrangement is provided for supporting rotatable indicia bearing disks.

Additional objects and advantages of the invention will be set forth in the description which follows, and in part will be obvious from the description, or may be learned by practice of the invention, the objects and advantages being realized and attained by means of the instrumentalities and combinations particularly pointed out in the appended claims.

Briefly described, the prisoner identification device of the present invention includes a box like frame having a support member mounted therein. The support member includes a plurality of upstanding arms or ears which are offset from a plane through the center of the support member and which have mounted on the free ends thereof rotatable indicia bearing disks. Each disk except the first disk has numerals from zero to nine equally spaced thereon. The first disk has numerals from one through nine spaced thereon and includes a blank space. The support member is constructed and arranged so that the indicia bearing disks are within the box structure which is conveniently provided with a slot therein so that one of the indicia on each disk can be placed in registry with the slot to form thereby the prisoner's identification number.

The invention further includes means for locating the identification device and hence the identification number adjacent the shoulder of the prisoner. As embodied herein, a string or wire is provided which is conveniently attached to the identification device. A weight is attached to the string so that the string will be placed over the prisoner's shoulder and the weight will maintain the identification device in the desired location.

The invention consists in the novel parts, constructions, arrangements, combinations and improvements shown and described.

The accompanying drawings, which are incorporated in and constitute a part of this specification, illustrate several embodiments of the invention and together with the description, serve to explain the principles of the invention.

It is to be understood that both the foregoing general description and the following detailed description are exemplary but are not restrictive of the invention.

In accordance with this invention means are provided for carrying a plurality of numerals which can be expeditiously located on the prisoner while his photograph is being taken. As embodied herein, this means comprises a box structure 2 having five closed sides and one open side. The front side of the box includes a slot or opening 4 therein which is preferably rectangular in form and which is adapted to permit observation of the prisoner's number. Conveniently located below this slot is a guideway 6 having flanges 8 along its longitudinal length. The guideway is for the purpose of receiving numerals therein indicating the day, month and year the picture was taken. It will be appreciated by those skilled in the art that the box structure may be made in any convenient manner.

Thus the box may be formed of a plurality of panels having tabs which are received in slots or openings in adjacent panels.

Figure 1:
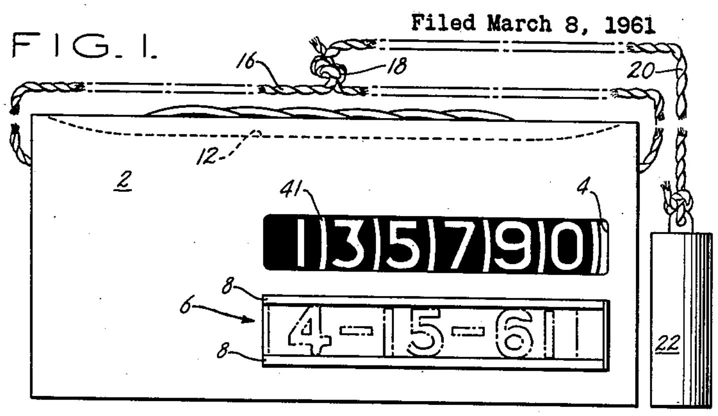
FIGURE 1 is a front view of the present invention.
Figure 2:
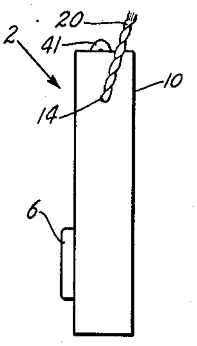
FIGURE 2 is an end view of the present invention.

In order to permit easy access of the fingers to the disk bearing numerals the rear face 10 of the box is relieved or cut away at 12 as shown in FIGURE 1.

In accordance with this invention means are provided for locating the identification device in proper position on the prisoner.

As embodied herein, the box structure 2 includes small holes or apertures 14 in the side walls adjacent the open end of the box. A string or wire 16 is suitably engaged in these openings. The wire is knotted at 18 to form a single wire 20. A small weight 22 weighing approximately two ounces is attached to the wire 20. Thus, the string can be placed over the prisoner's shoulder and the weight will balance the identification device near the prisoner's shoulder.

Figure 3:
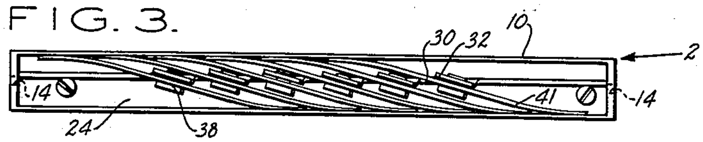
FIGURE 3 is a top view of the present invention.
Figure 5:
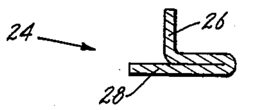
FIGURE 5 is a sectional view taken along line 5—5 of FIGURE 4.
Figure 6:
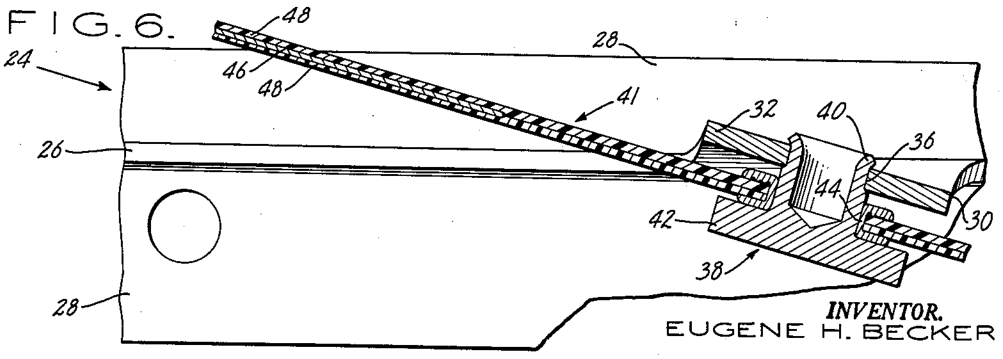
FIGURE 6 is a sectional view taken along line 6—6 of FIGURE 4.

In accordance with this invention means are provided for supporting a plurality of indicia bearing disks within the box. This means, as embodied herein, includes a supporting element 24. The supporting element can be made from an originally flat, preferably aluminum blank, which is folded over (FIGURE 5) to form an upstanding flange 26 in the center of the base 28. The upstanding flange is cut away at the ends thereof and is provided with a plurality of slots 30 which form a plurality, preferably six, upstanding ears or arms 32. The upstanding ears 32 are each twisted or turned so as to be offset from the upstanding flange 26 or a plane passing through the center of the base (FIGURE 3). The ears 32 are, however, parallel to each other.

Figure 4:
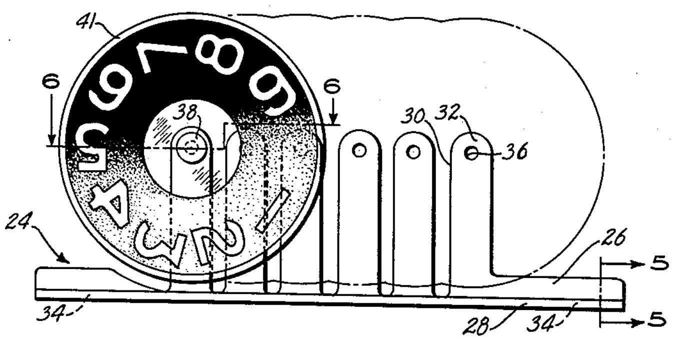
FIGURE 4 is a front view of the supporting means of the present invention.

In accordance with this invention means are provided to permit the supporting member to be removed from the box structure. Thus, the base 28 of the supporting member has holes 34 (FIGURE 4) which may be threaded, in alignment with holes in the base portion of the box. Screws or bolts can be used to removably assemble the supporting element within the box.

In accordance wth this invention means are provided for rotatably mounting indicia bearing disks on the supporting member. As embodied herein, this means comprises an aperture 36 adjacent the free end of each ear. The aperture receives a rivet 38 which is flanged over at one end 40 to secure the disk 41 to the ear and provided with an enlarged head 42 at the other end to engage the disk. The disk 41 includes an aperture in which is mounted a bearing 44 of suitable material.

In accordance with this invention a novel indicia bearing disk is provided. As embodied herein, this means comprises a circular piece of photographic paper 46 wherein certain areas have been exposed to form numbers thereon. The first disk has the numbers one through nine and one blank space so that numbers of five digits can be used. The other disks have evenly spaced thereon numbers from zero to nine.

The photographic paper is laminated between a vinyl plastic 48 with a matte finish to eliminate reflections to form a disk having a thickness in the area of twenty-thousandths of an inch. The disk of the present invention is long lasting and easily cleaned should they become dirty.

As shown in FIGURE 3, the disks 41 have a sufficient diameter such that the peripheral end portions of the disk will be in substantially flat engagement with the inner walls of the box structure 2. This arrangement has the advantage of maintaining frictional engagement between the indicia bearing disks and the box structure so that the prisoner's identification number will not be accidentally changed once it has been determined and stored in registry with the slot 4.

In operation, the disks 41 are turned to place the desired numerals in registry with slot 4 in the face of the box structure to form the identification number. Appropriate numerals are then placed in the guiding means 6 corresponding to the day, month and year the photograph is being taken. Then, the device is located near the shoulder of the prisoner and the string or wire 16, 20 is placed over his shoulder so that the weight 22 will maintain the device in its proper location.

It is to be understood that the invention in its broader aspects is not limited to the specific elements shown and described, but also includes within the scope of the accompanying claims any departures made from such elements which do not sacrifice its chief advantages.

What is claimed is:

1. An identification device comprising, a hollow box with one side open, a support element including a base and an upstanding flange portion mounted within said box, a plurality of upstanding ears on said flange which are offset from the plane of said flange and which are parallel to each other, disks having numbers on the surface thereof rotatably mounted on each ear, a slot in one surface of said box for permitting observation of one number on each disk.

2. An identification device comprising a rectangular box having one side open and a slot in one side thereof, a support member mounted within said slot and including a vertical flange, said flange being cut away at the ends thereof and provided with a plurality of slots to form a plurality of upstanding ears, said ears being offset from the plane of said flange and parallel to each other, an aperture adjacent the end of each ear, an indicia bearing disk rotatably mounted on each ear so that a single indicia on each disk can be placed in registry with said slot.

3. An identification device comprising a hollow box structure including a front face with a slot therein, a rear face having a recessed portion, a support member removably mounted in said box, a plurality of indicia bearing disks rotatably mounted on said support member and arranged to locate their indicia in registry with said slot.

4. An identification device comprising a hollow box with one side open, a plurality of upstanding ears mounted within said box and being offset from the plane of one surface of said box and being parallel to each other, an indicia bearing disc rotatably mounted on each ear, a slot in one surface of said box for permitting observation of one number on each disc.

References Cited in the file of this patent

UNITED STATES PATENTS

| | | |
|---|---|---|
| 848,956 | Beren | Apr. 2, 1907 |
| 857,906 | Redeout | June 25, 1907 |
| 1,046,963 | Burgquist | Dec. 10, 1912 |
| 1,779,684 | Van Sicklen | Oct. 28, 1930 |
| 2,842,877 | Stevens | July 15, 1958 |